3,079,353
LIGNOSULFONATE DERIVATIVE
Worth C. Goss, Kirkland, Wash., assignor, by mesne assignments, to Gossol, Inc., Seattle, Wash., a corporation of Washington
No Drawing. Filed Mar. 4, 1957, Ser. No. 643,519
4 Claims. (Cl. 260—17.5)

This invention relates to the utilization of waste sulfite liquor. More particularly the invention relates to a means whereby waste sulfite liquor can be treated to recover a modified lignosulfonate therefrom, and it relates further to a thermosetting resin derived from such lignosulfonate, such resin having value in the manufacture of paper and composition board.

Waste sulfite liquor is the spent liquor resulting from the pulping of wood by the so-called "sulfite process," which employs sulfur dioxide and a suitable alkaline material such as lime, magnesia or ammonia. It is known that waste sulfite liquor contains lignosulfonate; e.g., a calcium lignosulfonate if the cooking liquor employed is a calcium base liquor or magnesium or ammonium lignosulfonate if a magnesium base or ammonia base liquor has been employed. It is also known that waste sulfite liquor contains sugars and possibly sugar derivatives.

I have found that the sugars and other carbohydrates of waste sulfite liquor can be removed and that the lignosulfonate of component of the liquor can be separated by means of liquid anhydrous ammonia.

The waste sulfite liquor is first dehydrated by any suitable means. Commercial products are available which are dehydrated waste sulfite liquor, for example, "Orzan," which is a trademark of Crown Zellerbach Corp. of San Francisco, California.

If the waste sulfite liquor is a calcium or magnesium base liquor it is preferably first converted to an ammonia base liquor. This conversion may be done by any suitable means, for example, by flowing a solution of magnesium or calcium base liquor through a column of a suitable ion exchange resin containing sulfonic groups whereby the magnesium or calcium is adsorbed from the liquor. The de-mineralized liquor is then neutralized with ammonium hydroxide and dried in a spray drier. The ion exchange resin may be regenerated in the usual way. If a dry product is available which is derived from a sodium, magnesium or calcium base liquor it may be converted to an ammonium base product by dissolving in water, subjecting the solution to ion exchange as described above, then neutralized (to a pH about 7.7) by ammonium hydroxide and spray dried.

The proportions of dehydrated waste sulfite liquor and liquid anhydrous ammonia may range from about 400 to 1000 parts by weight of ammonia to 100 parts by weight of dehydrated liquor. Preferably about 500 to 700 parts of ammonia are employed for 100 parts of dehydrated liquor.

The dehydrated liquor and liquid ammonia are preferably mixed in an insulated vessel, which may be closed to prevent escape of ammonia vapor or which may have an outlet duct to lead ammonia vapor to a recovery system. If vaporization is permitted at atmospheric pressure, a temperature of —28° F. results which is satisfactory. If a pressure vessel is employed the extraction may be carried out at room temperature. Evaporation losses are preferably replaced, and evaporated ammonia should be compressed and reclaimed. Any type of stirring or mixing equipment may be employed, and the extraction procedure may be carried out in batch manner or in a continuous manner. Countercurrent extraction is desirable to remove completely the residue of extractable substance.

After suitable contact of the liquid ammonia with the dehydrated liquor, the supernatant liquid is drawn off, for example, by decantation, thereby leaving a residue of material which is insoluble in the liquid anhydrous ammonia. This residue will be referred to hereinafter as "amino lignosulfonate." The contact time of liquid anhydrous ammonia with the dehydrated liquor has a significant effect on the amino lignosulfonate. Thus, by one hour of contact I have produced an amino lignosulfonate containing 1.19% fixed nitrogen and soluble in water to the extent of 30 to 40%; whereas by sixteen hours contact I have produced an amino lignosulfonate containing 1.89% fixed nitrogen and soluble in water to the extent of 10 to 14%. It is my belief that liquid anhydrous ammonia acts not only as an extraction medium but that it introduces amino groups in the lignosulfonate. I believe this occurs by replacement of hydroxide by amino groups, thus

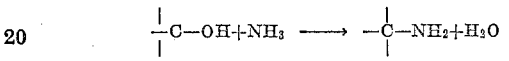

This is consistent with the strong dehydrating effect of liquid anhydrous ammonia and with the increase of fixed nitrogen brought about by longer contact of ammonia with dehydrated liquor. It is also my belief that the amino groups introduced by the ammonia tend to react with the sulfonic groups of the lignosulfonate to form less soluble material, which explains the decrease in solubility of the product of longer contact.

Other observed physical and chemical properties of the amino lignosulfonate are as follows: pH of a 5% aqueous solution is 2.1 compared to a pH of 0.8 in the case of ligninsulfonic acid. In both cases the material had been thoroughly washed with a solution of HCl in acetone, then with pure acetone to remove residual HCl.

The aluminum salt of the amino lignosulfonate can be precipitated from a solution of the ammonium salt by adding aluminum sulfate to yield a pH of 4.0. The precipitate is flocced. It is a very light brown, about the same shade as unbleached kraft paper.

The extract, i.e., the liquid ammonia solution of sugars separated from the ammonium lignosulfonate, may be evaporated to dryness. In commercial practice this will be done to recover the ammonia for reliquefaction and recycling to the system. The residue consists largely of sugars, which are left after evaporating the ammonia from the extract. By blowing air through an aqueous solution of this extract, the sugars are oxidized to sugar acids, probably including d-gluconic acid, saccharic acid, etc., which are converted by the ammonia present to their ammonium salts. These ammonium salts serve as a useful fertilizing material (by reason of the nitrogen) and also as a nutrient medium (by reason of the sugars and sugar acids) for nitrogen fixing organisms such as azobacter. Thus sterile soil may be inoculated with azobacter and then supplied with this nutrient medium to fix atmospheric nitrogen.

The amino lignosulfonate separated as described and without further treatment is useful to strengthen soft board. It is a water-soluble thermosetting resin whose aqueous solution can be used to saturate soft board (i.e., soft composition board), which is then baked. However, in accordance with the preferred embodiment of the invention, which will now be described, the amino lignosulfonate is preferably treated to modify it and to produce a thermosetting lignosulfonate resin which is particularly useful for adding to pulp to improve the properties of paper or board made from the pulp.

In accordance with the preferred embodiment of the invention, amino lignosulfonate is dissolved in water to a suitable concentration which may vary widely, e.g., 1 to 40% by weight. Then acetone and formaldehyde are added. The acetone is added in the amount of 3 to 50%, preferably about 10% based on the weight of solution. The formaldehyde may be added in the form of a 37% aqueous solution and is employed in the amount of 5 to 30%, preferably about 15% calculated as anhydrous formaldehyde and based on the weight of solids in the solution. Instead of formaldehyde, other aldehydes such as furfural or crotonaldehyde may be used. Preferably, however, formaldehyde is employed. The pH of the solution, after addition of the acetone and formaldehyde, is about 2 to 4. The solution is then refluxed at atmospheric pressure for 60 to 200 minutes, usually about 180 minutes.

The converted amino lignosulfonate, which will be referred to hereinafter as "amino lignosulfonate resin," may be recovered in dry form in the following manner from the reaction mixture: Nine parts by volume of acetone are added to each part by volume of reaction solution thereby precipitating the amino lignosulfonate resin which is filtered, washed with acetone and dried to yield a light brown powder. This powder may be mixed with a filler and molded under heat and pressure. Preferably, however, I employ the amino lignosulfonate resin in the form of its reaction solution directly from the reaction vessel and without any further purification. The dry powder is light in color, which is very desirable for purposes of utilization in paper and composition board. The amino lignosulfonate resin resulting from short contact (e.g., one hour) is highly soluble in water, whereas that resulting from long contact (e.g., 16 hours) is less soluble. Both forms are thermosetting.

The following examples will serve to illustrate the usefulness of the amino lignosulfonate resin produced as described above.

*Example 1.—Paper Product*

A preferred pulp is prepared as follows: Fiber chips from Douglas fir, western red cedar, southern pine or lodgepole pine or mixtures are processed in the manner described in detail and claimed in my copending application Serial No. 667,965, entitled "Pulp Manufacture," filed June 25, 1957, and now abandoned. Briefly this procedure is as follows: Chips are subjected to steam at atmospheric pressure and are then subjected to a high vacuum (e.g., 29.5 inches of mercury) for 7 minutes. The chips may be steamed and subjected to vacuum again. The principal purpose of the steaming and vacuum treatment is to eliminate as much air as possible from voids in the chips and to replace the air with water (steam condensate). Accordingly, the procedure should be carried out in an airtight vessel. Then, without opening the vessel to the atmosphere, a kraft-type pulping liquor containing 5.8 pounds of active $Na_2O$ per cubic foot is admitted to the vessel containing the steamed, vacuum-treated chips.

The chips and liquor are then subjected to air pressure until the pressure reaches 100 p.s.i. and this pressure is held a short time, e.g., 1 minute. The liquor is separated by draining and the chips are allowed to stand at room temperature for a considerable period of time, e.g., 12 hours. Then the chips are digested with steam at 50 p.s.i. for 30 minutes, then most of the liquid is squeezed out, and the chips are then heated in an open vessel with boiling water. The greatly diluted black liquor in the chips may be removed by a final squeeze. The chips are then ground to a pulp by attrition, e.g., by a Bauer refiner.

Pulp prepared in this manner is converted into paper in the usual manner by forming a pulp of suitable consistency in a beater and passing the pulp through a paper making machine. To the stock in the beater is added, however, ½ to 7% of amino lignosulfonate resin based on the weight of pulp. The amino lignosulfonate resin may be added in the form of a 5% aqueous solution. The pulp is stirred and paper maker's alum is added to a pH of 4.5. Then lime is added to a pH of 5.5. This precipitates the resin and fixes it on the fibers. Paper is formed in the usual way, including subjecting the paper to heated rolls which has the effect of setting the resin.

A premium grade of high ring crush strength paper is produced by this means which is superior in ring crush strength to normally produced kraft paper.

*Example 2.—Use of Lignosulfonate Resin in Conventional Kraft Liner Board*

Pulp was obtained from a large paper company, such pulp being regular production pulp employed to make kraft liner board. The technique of making sheets by hand was adjusted until a board was produced which was strictly comparable to kraft liner board produced and marketed by the company from which the pulp was obtained.

Handmade sheets of kraft liner board were made by this technique, first, without the addition of amino lignosulfonate resin, then with the addition of 2% and 4% of amino lignosulfonate resin, such percentages being by weight based on weight of paper produced. Where amino lignosulfonate resin was added, alum was also added to the pulp to yield a pH of 4.5 and then lime was added to raise the pH to 5.5. Board so produced was subjected to tests as indicated in Table I:

TABLE I

| Percent Amino Lignosulfonate resin | Mullen strength, p.s.i. | Ring Crush, lbs. | Ring Crush at 92% humidity, lbs. | Tear, Grams/lb./M | Freeness Canadian Standard |
|---|---|---|---|---|---|
| 0 | 141 | 111 | 77.4 | 8.6 | 620 |
| 2 | 140 | 146 | [1] 79.3 / [2] 91.5 | 11.1 | 610 |
| 4 | 146 | 147 | [1] 93.7 / [2] 93.1 | 6.8 | 620 |

[1] Pulp pH=4.8.
[2] Pulp pH=4.5.

It will be seen from an inspection of Table I that the Mullen strength was about the same for all of the samples; that ring crush was greatly improved, especially at 92% humidity; that tear strength was also greatly improved by the addition of 2% of the amino lignosulfonate resin and that the freeness of the pulp with and without lignosulfonate resin was about the same.

In Table II, test results are set forth of paper prepared from the amino lignosulfonate resin of the invention and specially prepared pulp prepared as described in Example 1.

TABLE II

| Percent Amino Lignosulfonate resin | Mullen strength, p.s.i. | Ring Crush, lbs. | Ring Crush 92% humidity, lbs. | Tear | Freeness |
|---|---|---|---|---|---|
| 0 | 107.5 | 103 | 67.5 | 6.1 | 700 |
| 2 | 125 | 133 | 85.2 | 6.8 | 710 |
| 4 | 117 | 131 | 86.4 | 6.3 | 710 |

*Example 3.—Board Preparation Employing Amino Lignosulfonate Resin*

Further details concerning the procedure of this example will be found in my copending application Serial No. 658,676, filed May 13, 1957, entitled "Composition Board." A suitable pulp is prepared from western red cedar chips by the procedure set forth in Example 1 hereinabove. To this pulp is added 7% by weight of amino lignosulfonate resin prepared in accordance with the invention. The amino lignosulfonate resin is added in the form of a 7% aqueous solution. As described in the aforesaid copending application Serial No. 658,676, entitled "Composition Board," it is preferred to employ a closed system in which pulp is introduced together with make-up amino lignosulfonate; no precipitant is employed; and all of the white water (i.e., the water drained through the screen in the formation of the board) is recycled. Alternatively a precipitant such as alum may be added in which case the white water, or a large portion thereof is discarded.

A pad prepared in this manner containing about 7% of amino lignosulfonate resin is then subjected to pressure, preferably by flexible diaphragm press as described in the aforesaid copending application Serial No. 658,676, entitled "Composition Board," at room temperature and for a time sufficient to squeeze the pad dry. The pad is then sprayed with a concentrated aqueous urea solution to incorporate about 1% of urea in the pad. The sprayed pad is rolled. The urea thus incorporated takes up or buffers acidity developed during drying and curing.

The board thus prepared has a high dry strength. Its wet strength can be improved greatly by a tempering procedure as follows:

A phenol-formaldehyde resin is employed which is prepared as follows: About 90 parts by weight of phenol and 45 parts by weight of formaldehyde together with 5% based on the weight of the complete mixture of 25% aqueous ammonia are mixed together and are heated at about 95 to 100° C. in an autoclave until the liquid is cloudy and a slight increase in viscosity is noted. The mixture is then cooled and permitted to stand, excess water is poured off and the residue of resin is dissolved in acetone. A 3-7% solution in acetone is used as a tempering solution to which 12% of beta naphthol or 0.1 to 0.5% toluene diisocyanate is added.

The board product as described is subjected to vacuum to eliminate air as much as possible, and the vacuum is broken by admitting the tempering solution described above. The board is soaked in the tempering solution until saturated and is then drained. Vacuum is then applied. The board is then heated to 300° F. for 1 to 10 minutes and is subjected to a sufficient pressure to produce a glossy appearance.

Board produced in this manner is light in weight (its density being about 0.34 to 0.6) compared to present day, conventional hardboard, which has a density of 1.0 or greater. Its strength is very high in relation to its density. It also has a desirably light color and it has remarkable working qualities. Thus, nails can be driven into the board and the driven nails will hold in the board as in ordinary lumber. Also the artificial board produced in accordance with the invention can be sawed and it can also be shaped with a blade in the same manner as ordinary lumber. By way of contrast, conventional hardboard is difficult to nail, it will not hold nails and it tends to leave ragged edges upon sawing. Also conventional hardboard is very difficult to work or shape with a blade.

It will, therefore, be apparent that a method has been provided of treating waste sulfite liquor to recover therefrom a novel and valuable material. Such material has an enhanced value when it is converted to a thermosetting resin in the manner described hereinabove. Thus the resin may be used to upgrade pulp for such purposes as producing kraft liner board, and it may also be used in the production of a hardboard having very remarkable properties.

I claim:

1. A method of treating waste sulfite liquor which comprises providing such liquor in dehydrated form and treating the same with liquid anhydrous ammonia to selectively dissolve the sugar components of the liquor and separate the same from the lignosulfonate component of the liquor.

2. A method of treating waste sulfite liquor which comprises providing ammonia base waste sulfite liquor in dehydrated form, selectively separating from the dehydrated liquor the lignosulfonate component thereof by means of liquid anhydrous ammonia, adding acetone and formaldehyde to the separated lignosulfonate and heating the mixture to yield a water-soluble thermosetting resin.

3. The method of treating waste sulfite liquor which comprises providing waste sulfite liquor in dehydrated form, treating the same with liquid anhydrous ammonia to separate the lignosulfonate components from the sugar components of the liquor, and then treating the separated lignosulfonate component to yield a thermosetting resin.

4. The method of claim 3 wherein the separated lignosulfonate is condensed with formaldehyde.

References Cited in the file of this patent

UNITED STATES PATENTS

| | | |
|---|---|---|
| 2,401,373 | Robinson et al. | June 4, 1946 |
| 2,676,931 | Pollak | Apr. 27, 1954 |
| 2,710,255 | Van Blaricom et al. | June 7, 1955 |
| 2,822,358 | Hearon et al. | Feb. 4, 1958 |
| 2,849,314 | Goss | Aug. 26, 1958 |